Figure 1:
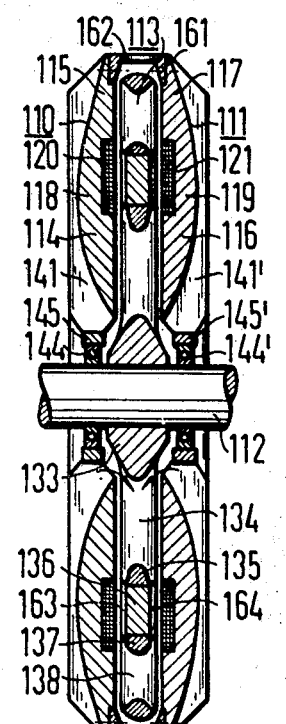

United States Patent

[11] 3,564,311

| [72] | Inventor | Hartwig Beyersdorf<br>Bremen-Arbergen, Germany (Sehmsdorfer Strasse 10 2060 Bad Oldesloe, Germany) |
|---|---|---|
| [21] | Appl. No. | 778,378 |
| [22] | Filed | Nov. 14, 1968 |
| [45] | Patented | Feb. 16, 1971 |

[54] ELECTROMAGNETICAL DISCLIKE CONSTRUCTED EDDY CURRENT BRAKE
2 Claims, 4 Drawing Figs.

[52] U.S. Cl. ................................................. 310/93, 310/105
[51] Int. Cl. ................................................. H02k 49/04

[50] Field of Search ............................................. 310/93, 103, 105

[56] References Cited
UNITED STATES PATENTS
2,487,551  11/1949  Hugin ........................... 310/93

*Primary Examiner*—D. X. Sliney

ABSTRACT: A flat rotor to be braked is formed with aligned inner and outer spokes spaced by a coaxial nonmagnetic ring which rotor is located between two stationary conductive discs in which are seated coaxial coils opposite said ring. Direct current is supplied to the coils to induce eddy currents in the conductive discs for braking.

PATENTED FEB 16 1971 3,564,311

3,564,311

ELECTROMAGNETICAL DISCLIKE CONSTRUCTED EDDY CURRENT BRAKE

My invention relates to dynamoelectric machines and more particularly to disc type eddy current inductor machines which are adaptable for use as brakes or dynamometers.

An object of my invention is to provide an improved disc type eddy current inductor machine.

Another object of my invention is to provide an eddy current inductor machine having relatively stationary discs in which eddy currents are induced.

A further object of my invention is to provide an eddy current inductor machine having a rotor disc of spoke wheel like construction for improved modulation of magnetic flux, and for improved air cooling of the relatively stationary discs.

A still further object of my invention is to provide an eddy current inductor machine having a rotor disc of high mechanical strength for high speeds of revolution.

According to my invention, I provide a dynamoelectric eddy current brake including a pair of relatively stationary, axially spaced apart discs with plane radial faces and formed of magnetic material, a rotor disc with radial faces arranged between said stationary discs, a pair of circular field exciting coils for magnetically exciting said stationary and rotor discs arranged to divide each of said radial faces of said stationary discs into two radially spaced apart areas in which eddy currents are induced, and means for supplying a direct current to said exciting coils, said rotor disc comprising a plurality of radially extending, circumferentially spaced apart spoke members of magnetic material and an annular ring member of nonmagnetic material and of a diameter approximately equal to the diameter of said exciting coils arranged to divide each of said spoke members into two radially spaced apart spoke parts.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 2:
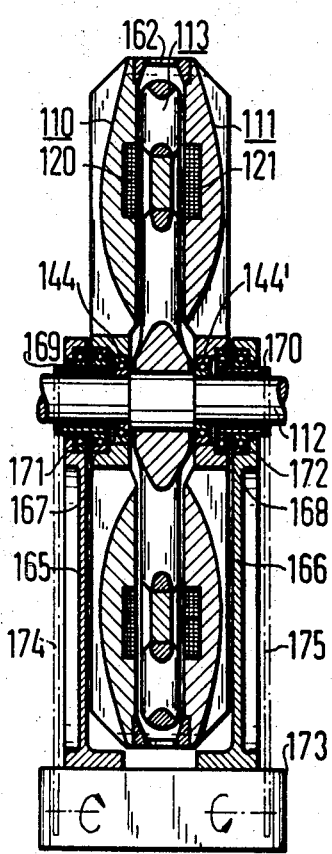
Figure 3:
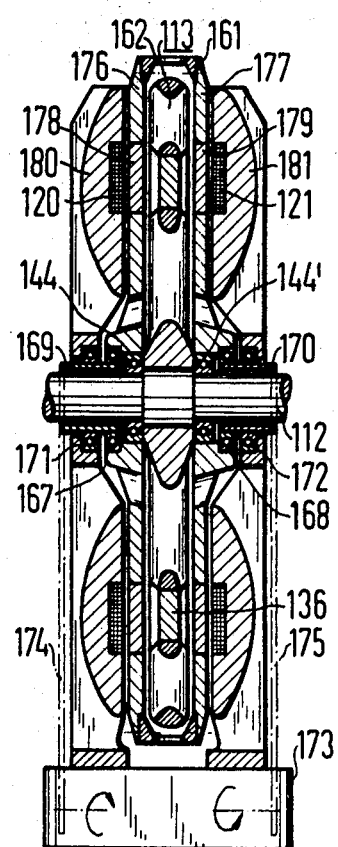
Figure 4:
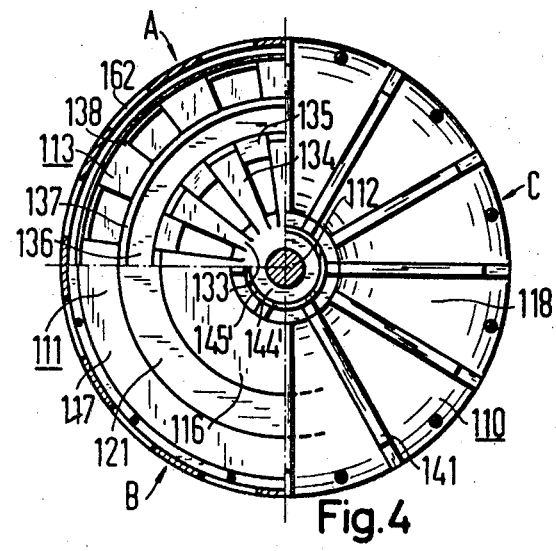

In the drawings, FIG. 1 is a sectional view illustrating an embodiment of my invention; FIG. 2 is a sectional view of a modification of my invention; FIG. 3 is a sectional view of another modification of my invention; FIG. 4 is composed of a partial sectional view A through an air gap, a partial front elevational view B of a stationary disc as viewed from the air gap, and a partial front elevational view C of a stationary disc as viewed from the outside of the machine, all views being taken of the machine shown in FIG. 1.

Referring to FIGS. 1 and 4 of the drawings, a dynamoelectric disc-type eddy current brake comprises a pair of stationary, axially spaced apart discs 110 and 111 with plane radial surfaces, and a rotor disc 112 with radial faces arranged between the stationary discs, and driven by shaft 113. The stationary discs 110 and 111 consist of a magnetic material, and each one has two concentric areas 114 and 115, or 116 and 117, in which eddy currents are induced and in which neither slots nor windings are provided. It is possible to coat these areas with layers of high electric conductivity such as copper in order to locate the eddy currents more exactly, and to increase the efficiency of the machine. A magnetic flux is produced by the exciting coils 120 and 121 and flows through yoke parts 118 and 119 of the stationary discs 110 and 111, the yoke parts being provided with radially extending cooling flanges 141 and 141' on their outer sides. The cooling flanges additionally increase the mechanical strength of the stationary discs. Furthermore, the inner ends of the cooling flanges carry nonmagnetic bushings 145 and 145' in which bearings 144 and 144' for shaft 112 are mounted. The stationary discs 110 and 111 are fixed to each other at their outer rims by a nonmagnetic sleeve 161 which in circumferential direction has a plurality of openings 162 serving as outlets for cooling air. The nonmagnetic material of sleeve 161 is a material of considerable temperature expansion so that sleeve 161 when heated by escaping air will expand axially at least as much as does rotor disc 113 heated by the same air after it has cooled stationary discs 110 and 111. In this way, a closing down of the air gaps on either side of rotor disc 113 will be avoided.

Rotor disc 113 is of spoke wheel like construction and consists essentially of two concentric cast parts, and of a ring member 136. The radially inner rotor part consists of a hub 133, a plurality of inner spoke parts 134, and a ring 135. On the circumference of ring 135, ring member 136 is mounted which consists of a nonmagnetic material and is of the same diameter as the exciting coils 120 and 121. The outer rotor disc part consists of an inner ring 137, a plurality of outer spoke parts separated by air spaces 138, and an outer ring 139. To improve ventilation achieved by rotor disc 113, ventilation blades 163 and 164 are provided on both sides of nonmagnetic ring member 136, each ventilation blade extending radially between an inner spoke part 134 and an outer spoke part. In this way, pairs of inner and outer spoke parts are connected to act like a single spoke for ventilation.

The concentric areas 115 and 117 adjacent to the air gaps may be provided with squirrel cages the conductor bars of which are located within slots. Such squirrel cages will reduce iron losses during full load service.

Referring now to FIG. 2, there is shown an embodiment adapted for use as an eddy current dynamometer. As described above, bearings 144 and 144' carry shaft 112 with rotor disc 113 and are mounted within relatively stationary discs 110 and 111. However, in this embodiment, discs 110 and 111 are carried by bearings 165 and 166 for limited rotational movement. These stationary discs 110 and 111 are fixed to each other by a nonmagnetic sleeve provided with openings 162, and act upon a force measuring device (not shown) in the conventional manner. The arrangement of bearings 144 and 144' is such the that the friction losses in these bearings are included in the measured test result.

To avoid wrong test results because of static friction occurring at slow limited rotational movements of relatively stationary discs 110 and 111, a construction comprising sleeves 169 and 170 and bearings 171 and 172 is used. Discs 110 and 111 are carried by bearings 167 and 168, mounted on sleeves 169 and 170 which surround shaft 112 in a very short distance. Both of sleeves 169 and 170, in their turn, are carried by bearings 171 and 172 mounted in supports 165 and 166. Further, sleeves 169 and 170 are driven at the same speed, but counterdirectionally. The driving power is supplied by motors (not shown) located within a socket 173 via transmissions 174 and 175. Rotation of sleeves 169 and 170 may additionally serve to further improve the cooling conditions of the machine, if the sleeves bear a number of ventilation blades (not shown) accelerating the cooling air towards rotor disc 113. Such ventilation blades will have to be mounted on sleeves 169 and 170 between bearings 167 and 171, and bearings 168 and 172, respectively.

Another embodiment comprises axially subdivided stationary discs. An axially inner part of each stationary disc is mounted for limited rotational movement and comprises a nonmagnetic ring of the same diameter as the exciting coils. In the inner stationary disc parts, eddy currents are induced. The outer part of each stationary disc is completely fixed and carries the exciting coil. The inner parts of both of the stationary discs are fixed to each other and form the working part of the machine capable of limited rotational movement. Eddy currents are exclusively induced in the inner disc parts which are cooled on both of their faces so that excellent cooling conditions are achieved. The fixed outer parts, including the exciting coils, are protected from heat-producing eddy currents.

The last-mentioned embodiment is shown in FIG. 3. On both sides of rotor disc 113, which is driven by shaft 112, inner relatively stationary disc parts, or eddy current discs 176 and 177 are provided which are mounted for limited rotational movement in the same way as stationary discs 110 and 111 of FIG. 2. Eddy current discs 176, 177 comprise nonmagnetic rings 178 and 179 of the same diameter as the exciting coils 120 and 121. These nonmagnetic rings force the magnetic flux to follow a fixed path. The axially outer disc parts 180 and 181 comprise the exciting coils 120 and 121 and serve additionally for substituting the supports 165 and 166 of FIG. 2.

I claim:

1. A dynamoelectric disc-type eddy current brake, including a pair of relatively stationary, axially spaced apart discs with plane radial faces and formed of magnetic material, a rotor disc with radial faces arranged between said stationary discs, a pair of circular field coils for magnetically exciting said stationary and rotor discs arranged to divide each of said radial faces of said stationary discs into two radially spaced apart areas in which eddy currents are induced, and means for supplying a direct current to said field exciting coils, said rotor disc comprising a plurality of radially extending, circumferentially spaced apart spoke members of magnetic material and an annular ring member of nonmagnetic material and of a diameter approximately equal to the diameter of said field exciting coils arranged to divide each of said spoke members into two radially spaced apart spoke parts.

2. A dynamoelectric disc type eddy current brake according to claim 1, further including a plurality of ventilation blades extending axially from either side of said ring member and extending radially between an inner and an outer one of said spoke parts each.